Figure 1:
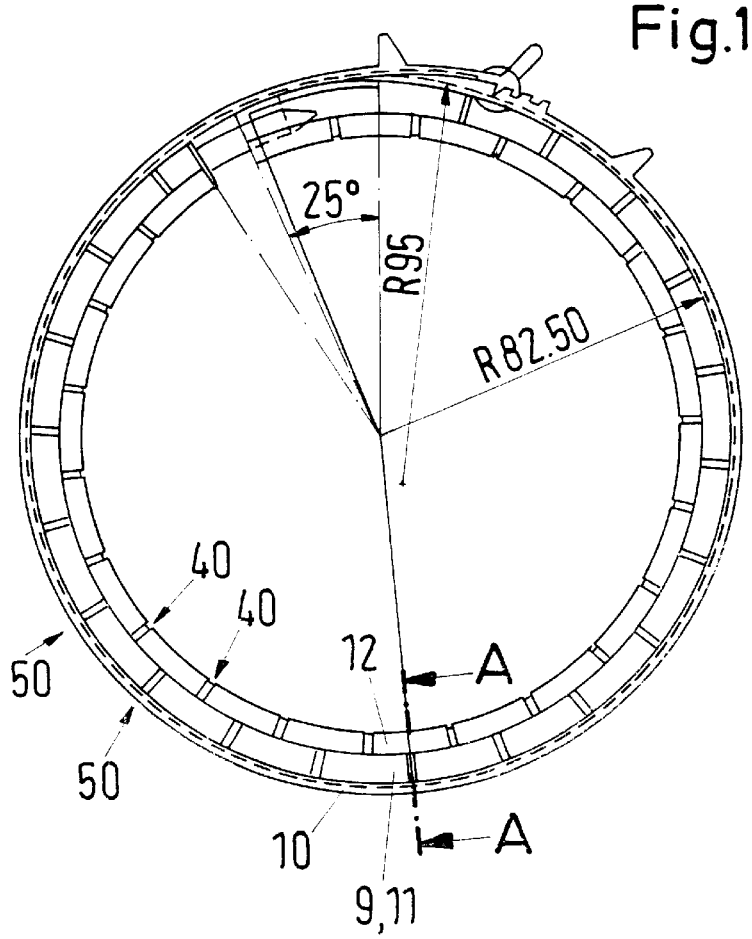

United States Patent
Brenning

Patent Number: 6,113,152
Date of Patent: Sep. 5, 2000

[54] SPRAY PROTECTION RING

[75] Inventor: Dieter Brenning, Rosengarten-Klecken, Germany

[73] Assignee: Protec Verschlusselements GmbH, Oststeinbek, Germany

[21] Appl. No.: 09/230,173

[22] PCT Filed: May 6, 1998

[86] PCT No.: PCT/EP98/02666

§ 371 Date: Jan. 21, 1999

§ 102(e) Date: Jan. 21, 1999

[87] PCT Pub. No.: WO98/54502

PCT Pub. Date: Dec. 3, 1998

[30] Foreign Application Priority Data

May 28, 1997 [DE] Germany .......................... 197 22 283

[51] Int. Cl.[7] .................................................. F16L 11/12
[52] U.S. Cl. ............................................ 285/45; 285/14
[58] Field of Search .......................... 285/15, 45, 14; 138/197, 198, 199

[56] References Cited

U.S. PATENT DOCUMENTS 4,483,554 11/1984 Ernst ........................................ 285/45
4,950,000 8/1990 Richardson ............................... 285/15
5,470,110 11/1995 Hupe ........................................ 285/45

FOREIGN PATENT DOCUMENTS

| 0 080 654 | 11/1982 | European Pat. Off. . |
| 29 23 259 | 9/1982 | Germany . |
| 31 46 803 | 6/1983 | Germany . |
| 32 17 997 | 11/1983 | Germany . |
| 33 02 139 | 7/1984 | Germany . |

*Primary Examiner*—Dave W. Arola
*Attorney, Agent, or Firm*—Venable; John P. Shannon

[57] ABSTRACT

The invention relates to a spray protection ring for pipe flanges consisting of a clamping wall, which covers the flange crack when placed on the peripheral surfaces of the flange. An annular connector (9) protrudes radially inwards from the clamping band. A radial and axial element (11) is joined to this connector, and serves as a spacer for an annular screen-like element (12) which extends around the periphery and acts as a valve. The connector (9) and the connected element (11) have a plurality of slits (50) distributed around the periphery. These slits (50) are out-of-line in peripheral direction in relation to a plurality of slits (40) distributed around the periphery of the screen (12). Before mounting, the axial extension of the screen (12) is slightly greater than the distance between the facing flange surfaces (20, 21).

3 Claims, 1 Drawing Sheet

SPRAY PROTECTION RING

The invention relates to a spray protection ring for pipe flanges consisting of a clamping wall covering a flange gap when placed on the circumferential surfaces of a flange, with a ring-shaped umbrella-like slotted shielding element extending radially, the axial extent of the shielding element in the radial direction before being installed being slightly larger than the distance between the surfaces of the flanges facing each other.

Spray protection rings mounted on pipe flanges serve to protect the environment when leakage occurs in a flange connection. Personnel in the vicinity are to be shielded from liquid escaping under pressure, and it is to be noted in this context that flange connections with no spray protection ring may allow a positively life-threatening stream of liquid to escape if a leak occurs.

State-of-the-art spray protection rings (29 32 259 C2 and DE-U 70 37 277.9) are unable to provide the safety desired. This is to be ascribed mostly to the fact that it is not possible to remove sufficient energy from liquid emerging under pressure.

This invention remedies this defect; it has the object of ensuring escape of liquid from pipeline connections under pressure without spraying in the event of seal malfunction.

This is accomplished in that a ring-shaped connector projecting radially inward from the clamping band, together with an element extending radially-axially integral with it acting as a spacer, is provided for the ring-shaped shielding element extending peripherally and acting as a valve, and in that the connector and the element integral with it have a plurality of slots distributed over the circumference which are offset circumferentially from a plurality of slots in the shield.

A spray protection ring for pipe flanges of the kind indicated above is disclosed in DE-PS 31 46 803 and EP 00 80 654 A1). In the case of this clamping band, which is positioned over the two flange leaves and the enclosed gap, between the flanges there is an annular deflection space with a deflecting surface for escaping liquid. There is also provided a downstream cushion space into which a liquid flows and in which its pressure is reduced. The two spaces communicate with each other through apertures in the partitions. This results in the formation of partial liquid streams flowing in opposite directions, so that the liquid gradually transfers its kinetic energy through deflection, impact, and pressure reduction into a zero-pressure space.

The present invention does not have the object of generating partial liquid streams, nor that of reducing kinetic energy by pressure reduction. In the spray protection ring claimed for the invention there is provided on the interior surface of the clamp band as spacer a ring-shaped connector projecting radially inward; this effects transition to a ring-shaped shield element acting as a valve, in such a way that it presents the appearance of a question mark when viewed in axial cross-section. In order for it now to be possible for a structure such as this to be moved over the flange and clamped together on the diameter of the flange, a plurality of slots, which nevertheless are for all practical purposes closed when the spray protection ring is in the operating position, are distributed over the circumference in the ring-shaped connector.

Liquid escaping as a result of leakage between pipe flanges strikes the protection ring opposite it, and only a very small part of it manages to move through the slots distributed over the circumference to enter the space beyond them and immediately reach the clamping band without the occurrence or involvement as a factor of any form of deflection or even rebound processes. Part of this flow may be propagated circumferentially, since the slots in the protection ring are offset circumferentially from those in the connector.

In the event of leakage in the flange connection first the space fills with liquid radially inside the protection ring, since the two axial peripheral surfaces of the protection ring rest more or less immobile on the surfaces of the flanges. If the pressure of the liquid is sufficiently high, the protection ring rises from the flange surface or surfaces so that sufficient energy is removed from the liquid as a result of the process and through the subsequent eddy processes.

These eddy processes and the valve action of the protection ring are essential to the efficiency of this invention. Deflection processes, division into partial streams, rebound relationships, and pressure reduction processes are not provided.

Figure 2:
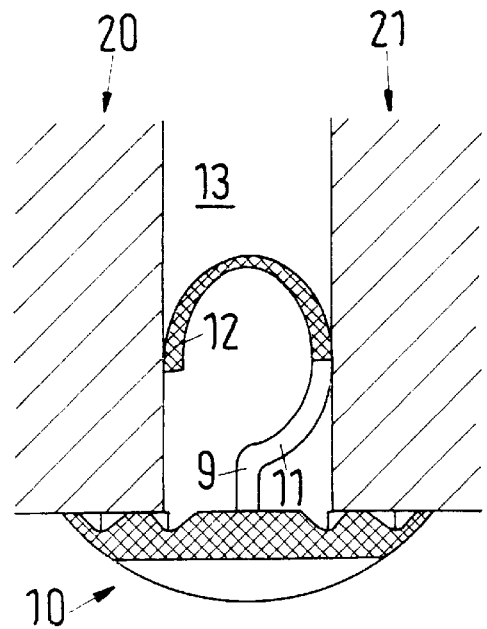

The invention is described in what follows on the basis of an exemplary embodiment, with reference to the drawing, in which FIG. 1 presents a side view of a spray protection ring as claimed for the invention, FIG. 2 a detailed view along A—A in FIG. 1, on an enlarged scale.

FIG. 1 shows a top view of a spray protection ring as installed, and in the upper area parts serving to draw the spray protection ring together after it has been positioned over the flange and in the process also to generate a permanent force acting in the circumferential direction.

By means of the permanent force, the upper area parts maintain the spray protection ring in a suitable circumferential size.

FIG. 2 presents a cross-sectional view, and shows in particular a clamping band 10 which is positioned over the exterior surfaces of two adjacent flanges 20 and 21.

A ring-shaped connector 9 projects inward from the circumference of the clamping band 10 and continues radially inward in the form of an axially-radially oriented extension element 11. The two elements 9 and 11 have openings in the form of a plurality of slots 50 distributed over the circumference, so that a relatively large ring-shaped spray protection ring may be positioned over a smaller flange connection and tightened over this connection. Element 11 effects transition to become an umbrella-shaped element 12 which extends between the opposite surfaces of flanges 20 and 21 and is more or less restrained or jammed between these surfaces. The umbrella-like element 12 shields the space further inward between the two flanges 20, 21 from the exterior. Liquid impinging on the shield in the area of 13 is initially repelled by the latter and ultimately reaches the space situated radially outside the shield 12, by way of the opening shield 12, which acts as a valve. The liquid present has expended its energy as a result of the process of opening the shield or valve element 12 and subsequent eddy processes to the extent that no hazardous stream of liquid can escape from the flange connection.

The shield element 12 as well has slots 40 in it distributed over the circumference, to make it at all possible for the spray protection ring as already described to be drawn together.

FIG. 1 shows that the two slot arrangements are offset from each other so that liquid which might escape between the slots 40 can reach the slots 50 only when flowing circumferentially.

What is claimed is:

1. A spray protection ring for pipe flanges that have an axial space therebetween, comprising:

an annular clamping band;

a ring-shaped connector (9) including a spacer extending radially inward from the clamping band and a shield (12) positioned radially inward of the spacer, each of said spacer and said shield defining a circumference; and parts maintaining the spray protection ring in a suitable circumferential size, wherein the spacer has a plurality of spacer slots distributed over the circumference of the spacer, and the shield has a plurality of shield slots distributed over the circumference of the shield, wherein the shield slots are offset in the circumferential direction from the spacer slots.

2. The spray protection ring of claim 1, wherein the shield has an axial dimension sufficient for the shield to span the space between the flanges.

3. The spray protection ring of claim 2, wherein the shield has a first side adapted to engage one of the flanges and a second side adapted to engage the other of the flanges, the shield curving radially inward between the first and second sides.

* * * * *